(12) United States Patent
O'Neill et al.

(10) Patent No.: US 7,280,501 B2
(45) Date of Patent: Oct. 9, 2007

(54) ALLOCATION OF TIMESLOTS IN A CELLULAR COMMUNICATION SYSTEM

(75) Inventors: Rorie O'Neill, Swindon (GB); Stephen Aftelak, Swindon (GB); Maya Benson, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 762 days.

(21) Appl. No.: 10/478,090

(22) PCT Filed: Feb. 25, 2002

(86) PCT No.: PCT/EP02/02142

§ 371 (c)(1), (2), (4) Date: Nov. 18, 2003

(87) PCT Pub. No.: WO02/098021

PCT Pub. Date: Dec. 5, 2002

(65) Prior Publication Data

US 2004/0142695 A1 Jul. 22, 2004

(30) Foreign Application Priority Data

May 25, 2001 (GB) ................................. 0112739.8

(51) Int. Cl.
*H04Q 7/00* (2006.01)
(52) U.S. Cl. ........................ 370/329; 370/330; 370/331
(58) Field of Classification Search ................ 370/329, 370/330, 341, 340
See application file for complete search history.

(56) References Cited

U.S. PATENT DOCUMENTS

| | | | | |
|---|---|---|---|---|
| 6,041,237 | A | * | 3/2000 | Farsakh ...................... 455/450 |
| 6,925,068 | B1 | * | 8/2005 | Stanwood et al. .......... 370/329 |
| 2002/0163979 | A1 | * | 11/2002 | Takatz et al. ............... 375/345 |
| 2004/0214582 | A1 | * | 10/2004 | Lan et al. ................ 455/452.2 |

FOREIGN PATENT DOCUMENTS

| | | |
|---|---|---|
| EP | 1 227 602 A | 7/2002 |
| WO | WO99 63686 A | 12/1999 |

* cited by examiner

*Primary Examiner*—Lester G. Kincaid
*Assistant Examiner*—Fred Casca

(57) ABSTRACT

A method of allocating timeslots between uplink and downlink communication in a cellular communication system (10) is described. The method comprises: for consecutive time division multiplex access, TDMA, frames comprising the timeslots, allocating a first selection of the timeslots to uplink communication in each of a plurality of cells (101, 201) and allocating a second selection of the timeslots to downlink communiction in each of the plurality of cells (101,201); and, when the number of timeslots of each frame to be allocated to uplink communication rather than downlink is different for different cells (101,201), varying the allocation of at least some of the uplink and downlink timeslots in a random or pseudo-random sequence in each cell (101, 201).

9 Claims, 3 Drawing Sheets

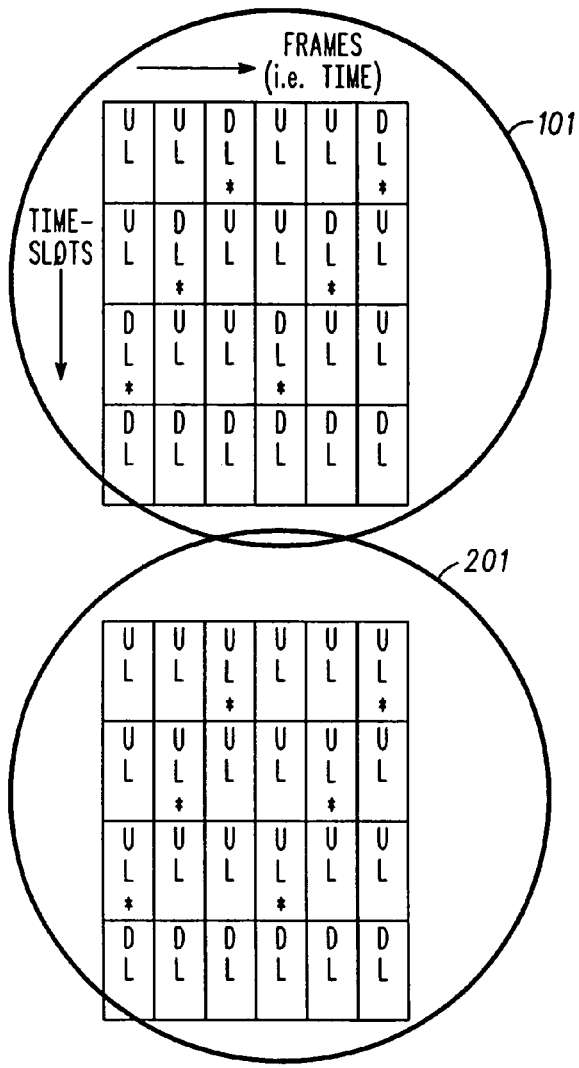
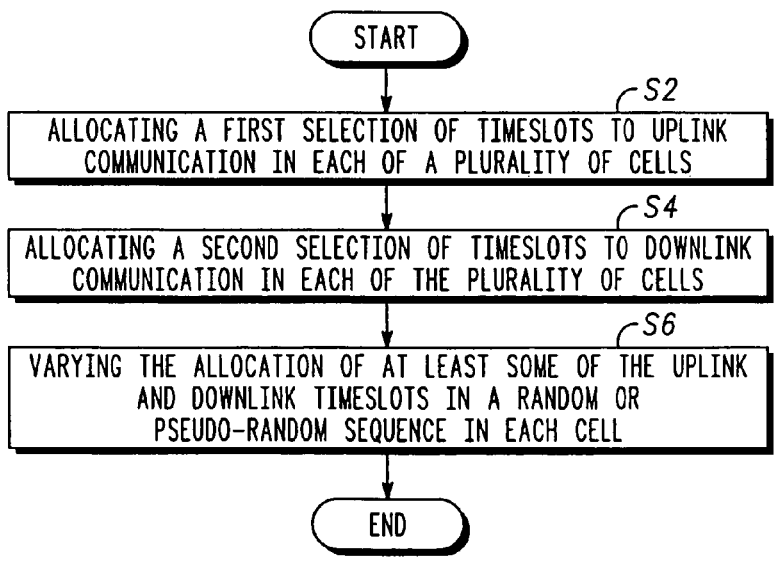
*FIG. 3*
*FIG. 4*

ALLOCATION OF TIMESLOTS IN A CELLULAR COMMUNICATION SYSTEM

FIELD OF THE INVENTION

This invention relates to the allocation of timeslots between uplink and downlink communication in a cellular communication system.

BACKGROUND OF THE INVENTION

In cellular communication systems, the area to be served is divided into cells, each served by a base station, often called base transceiver station (BTS). The base station and user terminals communicate with each other by means' of radio links established therebetween. Time division multiplex access (TDMA) is employed to divide the radio link resource, possibly in combination with code division multiplex access (CDMA), by temporally dividing a given frequency channel into timeslots which are organised in TDMA frames.

Communication from base station to user station is termed downlink communication, whereas communication from user station to base station is termed uplink communication. In TDMA cellular communication systems (e.g. GSM (Global System for Mobile Communications) systems) and combined TDMA/CDMA cellular communication systems (e.g. UMTS (Universal Mobile Telephone Standard, an example of a so-called third generation, or 3G, system) systems), time division duplex (TDD) is employed to divide allocation of signals for uplink transmission and downlink transmission, i.e. for each consecutive TDMA frame of a given frequency channel, some timeslots are allocated to uplink communication, and some are allocated to downlink communication.

The deployment of cells conforming to the Third Generation Partnership Project (3GPP)/UMTS time division duplex (TD-CDMA) mode of operation usually assumes that large groups of cells (and in the limit the whole network) co-ordinate the split of uplink and downlink assigned slots so that the switching points in time (uplink to downlink or vice versa) are the same across this group of cells. Without this, near-located cells could severely interfere with each other because uplink and downlink data transfer would be attempted at the same time on the same frequency and timeslot. The different scrambling (and possibly spreading) codes used are not sufficiently long to reduce the resultant interference to acceptable levels. Therefore, without some degree of coordination of switching points, the overall capacity of the system would be substantially reduced by this otherwise only partially mitigated interference.

However, this significantly reduces the ability of the network to respond to widely varying demands for uplink and downlink rates, both on a request-by-request basis and over all near-concurrent service requests. For example, assume a given switching arrangement across a group of cells, and assume an incoming service request that is best met by altering the slot allocations. This alteration would have to be co-ordinated across the whole group of cells to properly service the request. On the other hand, alteration of the switching points could compromise other ongoing service support within the group of cells.

There arises competing requirements between, on the one hand, co-ordination of uplink and downlink timeslot allocation in nearby cells, and on the other hand, flexibility to allocate different proportions of timeslots between uplink and downlink in a particular cell at an instant in time due to service variation.

One known way of alleviating the disadvantages of this competing requirement is disclosed by U.S. Pat. No. 5,828, 948. This suggests an allocation of uplink and downlink time-slots based on the measurements of interference in the uplink and downlink directions. This technique is suitable for TDD cellular mobile communication systems, but imposes additional complexity on the receivers.

Adaptive antenna techniques (beam-forming) can also be used to reduce interference by attempting to direct beams such that the signals associated with users in adjacent cells using the same timeslot, (one for uplink transfers, the other for downlink), interact less than otherwise. This is a complex and costly approach.

In another known approach, cell parameter hopping is defined for TD-CDMA where the scrambling and spreading codes allocated to users can be switched on some basis. This technique is intended to equalize performance between users, since the performance of the different codes is not the same. Therefore this technique shares the bad and good codes between users on a fairer basis. However, this technique does not solve the timeslot clash problem between nearby cells.

It would therefore be advantageous to provide a simpler way of alleviating the above-described problems without, for example, requiring measurements of interference on different time-slots.

STATEMENT OF INVENTION

In a first aspect, the present invention provides a method of allocating timeslots between uplink and downlink communication in a cellular communication system, as claimed in claim 1.

Further aspects are as claimed in the dependent claims.

BRIEF DESCRIPTION OF THE DRAWINGS

Embodiments of the present invention will now be described, by way of example only, with reference to the accompanying drawings, in which:

FIG. 3 is a schematic illustration of an allocation between uplink and downlink communication to timeslots in two cells in an embodiment of the present invention; and FIG. 4 is a flowchart showing process steps employed in an embodiment of the present invention.

DESCRIPTION OF PREFERRED EMBODIMENTS

Figure 1:
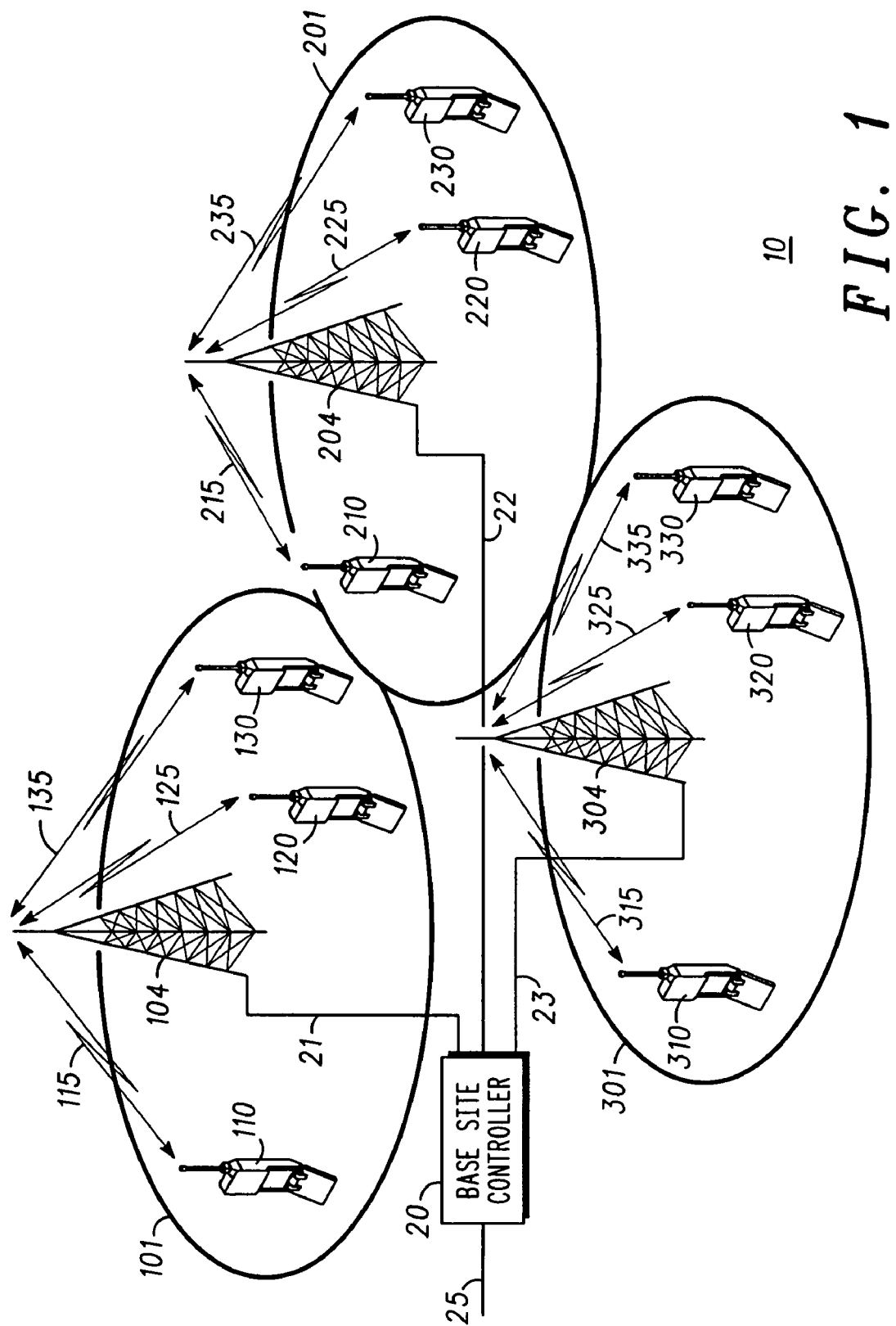
FIG. 1 is a schematic illustration of a cellular communication system.

This embodiment will be described in terms of a cellular communication system 10 illustrated schematically in FIG. 1. The system comprises many cells, but for clarity only three cells are shown, namely cells 101, 201 and 301. Service is provided in each cell by a respective base station 104, 204, 304.

A large number of mobile stations, e.g. mobile telephones, receive service in each cell via radio links established between the base stations and the mobile stations, but for clarity only three mobile stations are shown in each cell, as follows: mobile stations 110, 120, 130 with respective radio links 115, 125, 135 established with base station 104; mobile stations 210, 220, 230 with respective radio links 215, 225, 235 established with base station 204; and mobile stations 310, 320, 330 with respective radio links 315, 325, 335 established with base station 304.

Each base station is coupled to a base station controller (BSC) 20, which is itself coupled to a switching control component, such as a mobile services switching centre (MSC), not shown. In this embodiment, the cellular communication system 10 is a UMTS system, but in other embodiments can be any suitable type of cellular communication system. Therefore, applying UMTS terminology, in this embodiment BSC 20 is a Radio Network Controller station (RNC) and each base station 104, 204, 304 is a so-called Node-B.

In operation, the BSC 20 controls assignment of timeslots with respect to data transmission and reception by the base stations 104, 204, 304. Of particular relevance to this embodiment, the BSC 20 controls the allocation of timeslots to either uplink communication (i.e. transmission from mobile stations 110, 120, 130, 210, 220, 230, 310, 320, 330 to their respective serving base stations 104, 204, 304) or downlink communication (i.e. transmission from the base stations to the mobile stations).

In this embodiment a conventional BSC, i.e. RNC, has been adapted, by provision of a module (i.e. apparatus), to offer, and provide for, an advantageous implementation of timeslot allocation, as will be described in more detail below.

This adaptation may be implemented in any suitable manner to provide suitable apparatus. The module may consist of a single discrete entity added to a conventional BSC, or may alternatively be formed by adapting existing parts of a conventional BSC, for example by reprogramming of one or more processors therein. As such the required adaptation may be implemented in the form of processor-implementable instructions stored on a storage medium, such as a floppy disk, hard disk, PROM, RAM or any combination of these or other storage media.

Furthermore, whether a separate entity or an adaptation of existing parts or a combination of these, the module may be implemented in the form of hardware, firmware, software, or any combination of these.

It is also within the contemplation of the invention that such adaptation of transmission characteristics may alternatively be controlled, implemented in full or implemented in part by a module added to or formed by adaptation of any other suitable part of the communications system 10. For example, this may be implemented instead at the base stations 104, 204, 304 if they are provided with suitable inter-communication capability.

Also, in other communication system arrangements, the different base stations may be collocated, possibly also with a base station controller, and in this case the module or software may be in such a combined base station controller-base station. Further, in the case of other cellular communication system infrastructures, implementation may be at any appropriate switching node such as any other appropriate type of base station, base station controller etc.

Alternatively the various steps involved in determining and carrying out the allocation process (as will be described in more detail below) can be carried out by various components distributed at different locations or entities within any suitable network or system.

Figure 2:
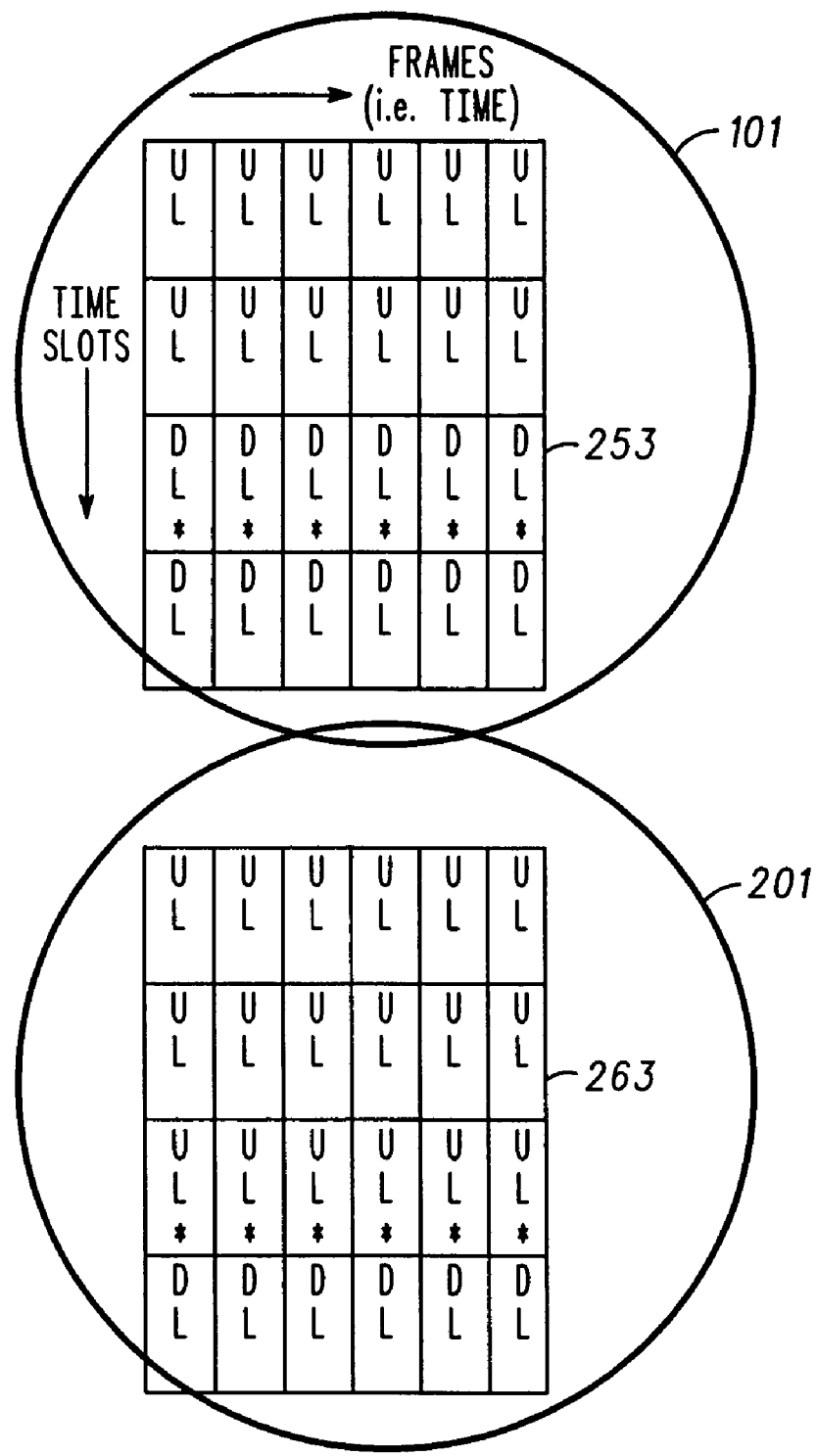
FIG. 2 is a schematic illustration of an allocation between uplink and downlink communication to timeslots in two cells that potentially prevents use of one timeslot.

FIG. 2 is a representation (example) of the timeslot allocations in two adjacent cells (e.g. cells such as cells 101 and 201) under conventional timeslot allocation procedures. Timeslot/frame locations where clashes occur between uplink and downlink in the two cells are indicated by an asterisk (*).

In this case it can be seen that there is a permanent clash in the case of the third timeslot in each frame, i.e. the third timeslot 253 in cell 101 is always allocated to downlink (DL) communication whereas the third timeslot 263 in cell 201 is always allocated to uplink (UL) communication. This could mean that one or both cells cannot support service in this timeslot, due for example to interference (i.e. the interference would occur continually to the same timeslot in each consecutive frame, and with this timeslot allocated always to the same mobile station results in the accumulative effect being too much for any redundancy measures to cope with). Therefore one of the cells would have to avoid using the timeslot.

However, in contrast, in this embodiment the timeslots for cells 101 and 201 are allocated as shown in FIG. 3. Referring to FIG. 3 (in which the same reference numerals are used as in FIG. 2), the allocation of timeslots to uplink and downlink is varied from frame to frame, such that the clashes (again shown by asterisks) are distributed between different timeslots in consecutive frames (both in a cell and across the two cells, i.e. across all cells when applied to the whole system). Thus, no single timeslot, i.e. single mobile station, experiences a very bad clash due to being continually (or for a long period) allocated a timeslot for uplink communication whilst a nearby cell allocates the same timeslot to downlink communication (or vice-versa).

In this embodiment the 'pain' (e.g. interference) is distributed across three timeslots in each cell on an equal basis. However, in general the switching need not be frame by frame (i.e. in other embodiments it may be slower, i.e. only implemented for some of the frames rather than each consecutive frame), but the faster the switching the more likely it is that intermittent clashes are recoverable since they are now distributed in time across multiple frame periods, which are largely recoverable by the use of coding and interleaving.

In simpler embodiments than the one being described, the switching (or hopping) is implemented randomly, e.g. in terms of which timeslot is allocated the clash each frame. However, in the present embodiment, a deterministic pattern is employed, as is apparent from FIG. 3. The pattern is provided by the BSC 20 (or 'agreed' between the base stations) such that across the cells as a whole it reduces (if not entirely avoids) the number of clashes between uplink and downlink slots. The pattern may be adapted to changing patterns of calls or services supported across the cells, and may be arranged to prioritise the avoidance of clashes for cells which are prone to higher interference, e.g. are in close proximity, whilst allowing more clashes for cells prone to lower interference, e.g. are further apart (i.e. in the case of the present embodiment, the pattern over the three cells 101, 201, 301 is such as to allow more clashes between cells 101 and 301 than between cells 101 and 102).

In this embodiment the above described "hopping" allocation of timeslots is applied to a subset of slots (in this case the first three timeslots), with the other slots forming another subset conforming to a fixed switching pattern across the cells (in this case the fourth timeslot), as can be seen from FIG. 3. In simpler embodiments, the above-described "hopping" allocation of timeslots may be applied to all the timeslots on a TDD carrier.

The above-described allocation may be implemented in all cells of a cellular communication system, or just one or more groups of cells in a cellular communication system.

In the preferred embodiment, services supported by the subset of timeslots conforming to the fixed allocation may exhibit higher quality of service (QoS), but may be only a restricted set of services. The hopped subset of timeslots may exhibit a lower quality of service. Therefore complex services made up of component services with different QoS requirements may be split between those slots using the fixed switching points and those using timeslot hopping, or indeed if appropriate, a component service may be split across both types of slot.

For an example of the latter consider a service or service component comprising core data which must get through and other data which enhances the quality of the service if it gets through, but is not essential for service operation (called enhancement data). There may be more than one grade of enhancement data. The core data may be sent on the slot allocation with fixed switching points, whereas the enhancement data may be sent on the slots experiencing hopping and intermittent clashes.

Examples of such services are still picture applications that progressively improve the detail of the picture sent, and embedded speech codecs, where the core data is required for intelligibility and the enhancement data improves the perceived quality of the speech.

Thus, a method has been described for allocating timeslots between uplink and downlink communication in a cellular communication system. This method can be summarised in terms of a flowchart illustrated in FIG. 5, the method comprising the following steps:

allocating a first selection of timeslots to uplink communication in each of a plurality of cells (step s2);

allocating a second selection of timeslots to downlink communication in each of the plurality of cells (step s4); and varying the allocation of at least some of the uplink and downlink timeslots in a random or pseudo-random sequence in each cell (step 6).

Certain benefits of the above-described arrangements are as follows. Referring to FIG. 2, one of the cells would have to avoid using the timeslot. The technique illustrated by FIG. 3 allows the timeslot to be used in both cells, thereby increasing the flexibility with which a cell can support services, and increasing the overall capacity of the system, with perhaps only a small reduction in quality of service (e.g. intermittent clashes on slots which may not be totally recoverable) in some cases.

It will be understood that the embodiments described above provide, inter alia, the following advantages:

(i) avoids the fixed allocation scenario where clashes result in lower capacity and flexibility.

(ii) allows the timeslot to be used in both cells, thereby increasing the flexibility with which a cell can support services.

(iii) increases the overall capacity of the network.

(iv) avoids the need to measure interference or use interference measurements.

(v) avoids the cost of beam-forming approaches.

The invention claimed is:

1. A method of allocating timeslots between uplink and downlink communication in a cellular communication system, the method comprising:

for consecutive time division multiplex access, TDMA, frames comprising the timeslots, allocating a first selection of the timeslots to uplink communication in each of a plurality of cells and allocating a second selection of the timeslots to downlink communication in each of the plurality of cells; and, when the number of timeslots of each frame to be allocated to uplink communication rather than downlink is different for different cells, varying the allocation of at least some of the uplink and downlink timeslots in a random or pseudo-random sequence in each cell; and wherein the uplink and downlink timeslot allocations for the cells in the system are fixed in a first subset of timeslots in each frame and selected in different respective timeslot allocations than the first subset of timeslots in a second subset of timeslots of the consecutive TDMA frames; and communication services are divided between the first and second subsets of timeslots according to quality of service, QoS, with higher QoS services being allocated to the first subset of timeslots and lower QoS services being allocated to the second subset of timeslots.

2. A method according to claim 1, wherein the uplink and downlink timeslot allocations for the cells in the system are selected differently in each consecutive TDMA frame.

3. A method according to claim 1, wherein the uplink and downlink timeslot allocations for the cells in the system are selected in different respective subsets of timeslots in only some of the consecutive TDMA frames.

4. A method according to claim 1, wherein the uplink and downlink timeslot allocations for the cells in the system are selected randomly in successive frames.

5. A method according to claim 1, wherein the uplink and downlink timeslot allocations for the cells in the system are selected using a deterministic pattern in successive frames.

6. A method according to claim 4 or claim 5, wherein the respective random or the deterministic pattern of timeslot allocation is arranged to adapt to a changing pattern of calls or services supported across the cells.

7. A method according to claim 4 or claim 5, wherein the respective random or deterministic pattern is arranged to prioritize avoidance of clashes between uplink and downlink allocation of common timeslots for cells which are most likely to interfere, for example cells in closest proximity.

8. A method according to claim 1, wherein a given communication service requires data to be communicated comprising at least two different parts of the data with different respective QoS requirements, the part of the data with a higher QoS requirement is allocated to the second subset of timeslots, and the part of the data with a lower QoS requirement is allocated to the first subset of timeslots.

9. A method according to claim 8, wherein the part of the data with a higher QoS requirement is core data of the service, and the part of the data with a lower QoS requirement is enhancement data of the service.

* * * * *

UNITED STATES PATENT AND TRADEMARK OFFICE
CERTIFICATE OF CORRECTION

PATENT NO. : 7,280,501 B2  Page 1 of 1
APPLICATION NO. : 10/478090
DATED : October 9, 2007
INVENTOR(S) : O'Neill et al.

It is certified that error appears in the above-identified patent and that said Letters Patent is hereby corrected as shown below:

On the title page, item (57), under "ABSTRACT", in Column 2, Line 4, delete "multiplex" and insert -- multiple --, therefor.

On the title page, item (57), under "ABSTRACT", in Column 2, Line 8, delete "communiction" and insert -- communication --, therefor.

In Column 1, Line 15, delete "means'" and insert -- means --, therefor.

In Column 1, Lines 16-17, delete "multiplex" and insert -- multiple --, therefor.

In Column 1, Lines 18-19, delete "multiplex" and insert -- multiple --, therefor.

In Column 6, Line 1, in Claim 1, delete "multiplex" and insert -- multiple --, therefor.

Signed and Sealed this

Second Day of June, 2009

JOHN DOLL
*Acting Director of the United States Patent and Trademark Office*